US008989676B2

(12) United States Patent
Jeon et al.

(10) Patent No.: US 8,989,676 B2
(45) Date of Patent: Mar. 24, 2015

(54) APPARATUS AND METHOD FOR TRANSMISSION POWER CONTROL AND DYNAMIC FREQUENCY SELECTION DURING MOVEMENT OF BASE STATION

(75) Inventors: Joseph Jeon, Seongnam-si (KR); Sung-Hyun Choi, Seoul (KR); Kwang-Hun Han, Icheon-si (KR); Dong-Myoung Kim, Seoul (KR); Du-Ho Kang, Seoul (KR); Seung-Hyun Choi, Seoul (KR)

(73) Assignees: Samsung Electronics Co., Ltd., Suwon-Si (KR); SNU R&DB Foundation, Seoul (KR)

( * ) Notice: Subject to any disclaimer, the term of this patent is extended or adjusted under 35 U.S.C. 154(b) by 525 days.

(21) Appl. No.: 13/040,929

(22) Filed: Mar. 4, 2011

(65) Prior Publication Data

US 2011/0218005 A1    Sep. 8, 2011

(30) Foreign Application Priority Data

Mar. 4, 2010    (KR) .......................... 10-2010-0019608

(51) Int. Cl.
*H04B 7/00* (2006.01)
*H04M 1/00* (2006.01)
*H04B 1/38* (2006.01)
*H04W 72/08* (2009.01)

(52) U.S. Cl.
CPC .................................. *H04W 72/08* (2013.01)
USPC .......................... 455/73; 455/562.1; 455/522

(58) Field of Classification Search
CPC ........................... H04W 72/08; H04W 72/005
USPC ...................... 455/522, 67.11, 509, 69, 63.1
See application file for complete search history.

(56) References Cited

U.S. PATENT DOCUMENTS

| 7,433,702 | B2 * | 10/2008 | Lindskog et al. ............. 455/522 |
| 8,502,733 | B1 * | 8/2013 | Negus et al. .................. 342/359 |
| 2005/0090210 | A1 * | 4/2005 | Hamada ..................... 455/127.1 |
| 2007/0117517 | A1 * | 5/2007 | Hui et al. ................... 455/67.11 |
| 2013/0207841 | A1 * | 8/2013 | Negus et al. .................. 342/359 |

* cited by examiner

*Primary Examiner* — Tilahun B Gesesse (57) ABSTRACT

An apparatus and method perform Transmit Power Control and Dynamic Frequency Selection (TPC/DFS) during a movement of a Base Station (BS). A network environment around the mobile BS is modeled. Based on the modeling result, a TPC/DFS operation scheme that is most suitable to the mobile BS is selected.

20 Claims, 6 Drawing Sheets

APPARATUS AND METHOD FOR TRANSMISSION POWER CONTROL AND DYNAMIC FREQUENCY SELECTION DURING MOVEMENT OF BASE STATION

CROSS REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 4, 2010 and assigned Serial No. 10-2010-0019608, the entire disclosure of which is hereby incorporated by reference.

TECHNICAL FIELD OF THE INVENTION

The present invention relates to a Transmit Power Control and Dynamic Frequency Selection (TPC/DFS) algorithm operation of a mobile Base Station (BS). More particularly, the present invention relates to an apparatus and method for applying an optimized TPC/DFS for optimizing the performance of the entire network, when a moving BS moves to and enters a fixed BS network in a situation in which fixed BSs are performing TPC/DFS based on a maximized gain of the entire network.

BACKGROUND OF THE INVENTION

Unlike fixed BS systems installed, operated, and maintained/managed by an operator through a cell plan and a driving test, mobile BSs provide a leading model in which a position of a mobile BS is variably operated by a user himself who carries the mobile BS.

In this situation, because users may not have professional knowledge of mobile communication systems, installation and optimization should be possible by applying power sources to mobile BSs.

For this installation and optimization, mobile BS systems should recognize a wireless environment state dependent on new deployment or a change of neighboring mobile BSs during operation and, on this basis, should control a frequency, a transmit power, and such.

When a BS is to perform TPC/DFS, the BS performs TPC/DFS adaptive to situations of other BSs at a TPC/DFS time point. However, as the result observed through the experiment, this approach is profitable when only fixed BSs exist but is not profitable when moving BSs are intermixed.

For example, when a TPC/DFS execution period is relatively long compared to a movement speed of a moving BS, the moving BS would move within a network until the next TPC/DFS execution with a power and frequency value determined at a previous TPC/DFS execution time point. This can bring about unexpected degradation of performance.

As such, there is a problem that previously determined power and frequency values have a rather negative influence on a network with a movement of a BS.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for Transmit Power Control and Dynamic Frequency Selection (TPC/DFS) during a movement of a Base Station (BS).

Another aspect of the present invention is to provide an apparatus and method for more efficient TPC/DFS execution for, when a moving BS performs TPC/DFS, making use of expected movement direction and movement speed of the moving BS, information of neighboring fixed BSs, and such, and improving latent degradation of performance and inefficient result that may occur when performing TPC/DFS without considering these points.

The above aspects are achieved by providing an apparatus and method for TPC/DFS during a movement of a base station.

According to one aspect of the present invention, a method for TPC/DFS operation in a mobile BS is provided. The method includes modeling a network environment around the mobile BS. Based on the modeling result, a TPC/DFS operation scheme that is most suitable to the mobile BS is selected.

According to another aspect of the present invention, an apparatus of a mobile BS performing TPC/DFS is provided. The apparatus includes a receiver and a TPC/DFS controller. The receiver receives signals from a Cooperative Mobile BS (CMBS) and a mobile communication terminal. The TPC/DFS controller models a network environment around the mobile BS based on the received signals and selects a TPC/DFS operation scheme most suitable to the mobile BS based on the modeling result.

According to yet another aspect of the present invention, an apparatus for performing Transmit Power Control and Dynamic Frequency Selection (TPC/DFS) in a mobile Base Station (BS) is provided. The apparatus includes a TPC/DFS controller that models a network environment around the mobile BS based on signals received from a Cooperative Mobile BS (CMBS) and a mobile communication terminal. Based on the modeling result, the TPC/DFS controller selects a TPC/DFS operation scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

Henceforth, embodiments of the present invention provide an apparatus and method for Transmit Power Control and Dynamic Frequency Selection (TPC/DFS) during a movement of a base station.

The embodiments of the present invention are constructed as follows. First, a method of directly performing TPC/DFS is described and, to this end, a method for predicting the mobility of a BS is also described.

In prior art, there is no procedure for prediction at TPC/DFS execution because required information relies only on a current channel and network environment. This is because TPC/DFS considering only a current situation may not be optimal for a network with mobility as above.

In a TPC/DFS execution method, a BS performs TPC/DFS capable of determining a maximum gain based on an allocation of frequencies and power of neighboring BSs. For example, each BS may determine a frequency and power in the direction of maximizing the sum of capacities (i.e., the Shannon capacity, $\log_2 (1+\text{SINR})$) of the entire network.

In a mobility prediction method, a BS collects information related to its own mobility such as a movement speed, a movement direction, and such, and predicts future mobility. A Global Positioning System (GPS) device and such may be used for information collection. In detail, the mobility prediction may be carried out as follows.

Based on the mobility information (i.e., a speed and a direction) of a moving BS, the moving BS predicts its movement trajectory traveled until the next TPC/DFS execution. Most easily, there may be a prediction method assuming a straight movement. At one extreme, the BS may assume a random movement with no relationship to a speed or a direction.

This prediction about the movement trajectory may be different depending on how it models mobility and needs assumption suitable to a situation. For purposes of description only, embodiments of the present invention are described assuming a straight movement. This assumes that, during the experiment, a movement speed of a BS is maintained, and a movement direction of the BS is maintained within a specific angle as well.

Particularly, the simulation is based on the assumption that, during the simulation, a BS maintains a movement speed, and a movement direction does not deviate from a current movement direction by more than a specified angle. Based on this model, the BS determines a situation capable of making TPC/DFS most effective, through a method of predicting a linear movement trajectory.

A moving BS operates based on the two logics below:

First, the mobile BS periodically collects information on its own mobility; and

Secondly, based on the collected information, the mobile BS models the influence of mobility on neighboring BSs and predicts its own movement trajectory. The mobility information may be path information along which the moving BS moves.

Figure 1:
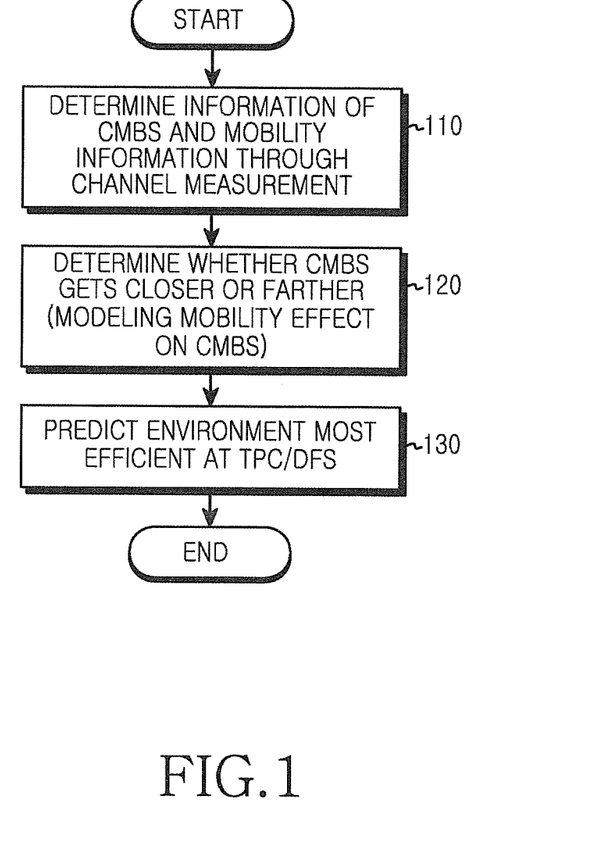
FIG. 1 illustrates a process for periodic information collection and movement path prediction in a mobile Base Station (BS) according to an embodiment of the present invention.

FIG. 1 illustrates a process for periodic information collection and movement path prediction in a mobile BS according to an embodiment of the present invention. The period referred herein is different from a period of TPC/DFS, and may be a relatively short period of time. The mobile BS performs prediction prior to performing TPC/DFS.

Referring to FIG. 1, when the period returns, in block 110, the mobile BS determines information of a Cooperative Mobile BS (CMBS) through channel measurement, and determines information on its own mobility. Here, the CMBS represents a fixed BS.

In block 120, the mobile BS determines if its own CMBSs get closer or farther based on the determined channel measurement value and, based on this determination, models a network environment dependent on its own movement path.

A criterion for a mobile BS to determine the approach of a CMBS may be a signal strength in an embodiment. That is, if a signal strength of a CMBS determined by the mobile BS gets stronger, it may be determined that the mobile BS gets closer and, if the signal strength gets weaker, it can be determined that the mobile BS gets farther.

And, the modeling may predict a change of a channel based on current and previous channel measurement values, and is similar to predicting a path loss exponent.

In block 130, based on the modeling result, the mobile BS predicts an environment most efficient at TPC/DFS. Here, predicting the most efficient environment represents determining what TPC/DFS operation scheme it will select. This is described in FIG. 2 below.

Figure 2:
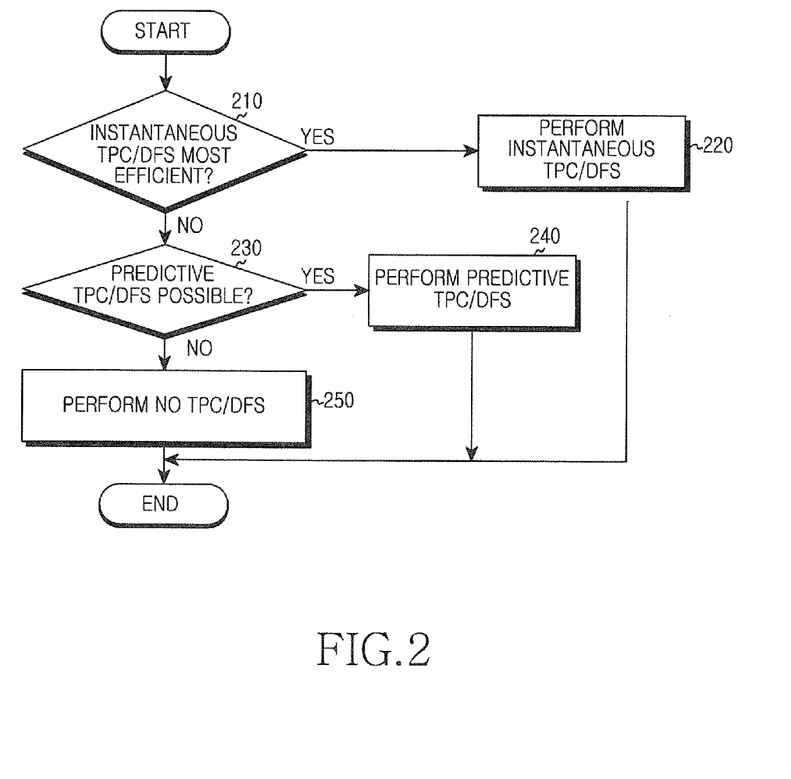
FIG. 2 illustrates a process of a mobile BS performing Transmit Power Control and Dynamic Frequency Selection (TPC/DFS) according to an embodiment of the present invention.

FIG. 2 illustrates a process of a mobile BS performing TPC/DFS according to an embodiment of the present invention.

Referring to FIG. 2, the mobile BS makes preparations to perform TPC/DFS in preparation for three situations below:

The first is that the mobile BS makes a preparation to perform TPC/DFS considering only a current state;

The second is that the mobile BS makes a preparation to perform TPC/DFS based on a situation predicted by periods; and The third is that the mobile BS makes no preparation assuming a situation of performing no TPC/DFS.

Based on these preparations, the mobile BS performs virtual TPC/DFS and compares respective gains with each other. Based on a previous operation of the mobile BS, the mobile BS selects TPC/DFS according to how effective each TPC/DFS selection has been.

If it is determined on the basis of the selection result that the mobile BS has no gain or has no particular criterion of mobility during mobility monitoring, i.e., if it is determined that instantaneous TPC/DFS is most effective in block 210, the mobile BS proceeds to block 220 and performs TPC/DFS based on the current situation.

That is, the mobile BS performs instantaneous TPC/DFS. In this situation, there is actually no way to be able to determine a particular gain whatever way is used, and trying to determine a gain is causes a waste of resource.

If the mobile BS determines on the basis of the selection result that the mobility has a pattern in block 230, the mobile BS proceeds to block 240 and performs TPC/DFS based on a path predicted periodically.

At this time, the mobile BS should determine how well it performs TPC/DFS along a moved path. Embodiments of the present invention assume that a mobile BS performs virtual TPC/DFS along a given path in a little shorter period, and applies the average of most effective virtual TPC/DFS result to actual TPC/DFS execution.

Embodiments of the present invention assume that a mobile BS is moving in a straight line. The mobile BS performs a prediction based on this movement pattern.

If the conditions in blocks 210 and 230 are not satisfied, it is a situation in which a movement speed of a mobile BS is more than a specific speed. In this situation, separately performing TPC/DFS may just cause an overhead, and this is because it may be determined that the influence exerted by the moving BS does not have great effect during the entire time. Accordingly, in this situation, in block 250, the mobile BS reduces an overhead for TPC/DFS and takes a gain.

Figure 3:
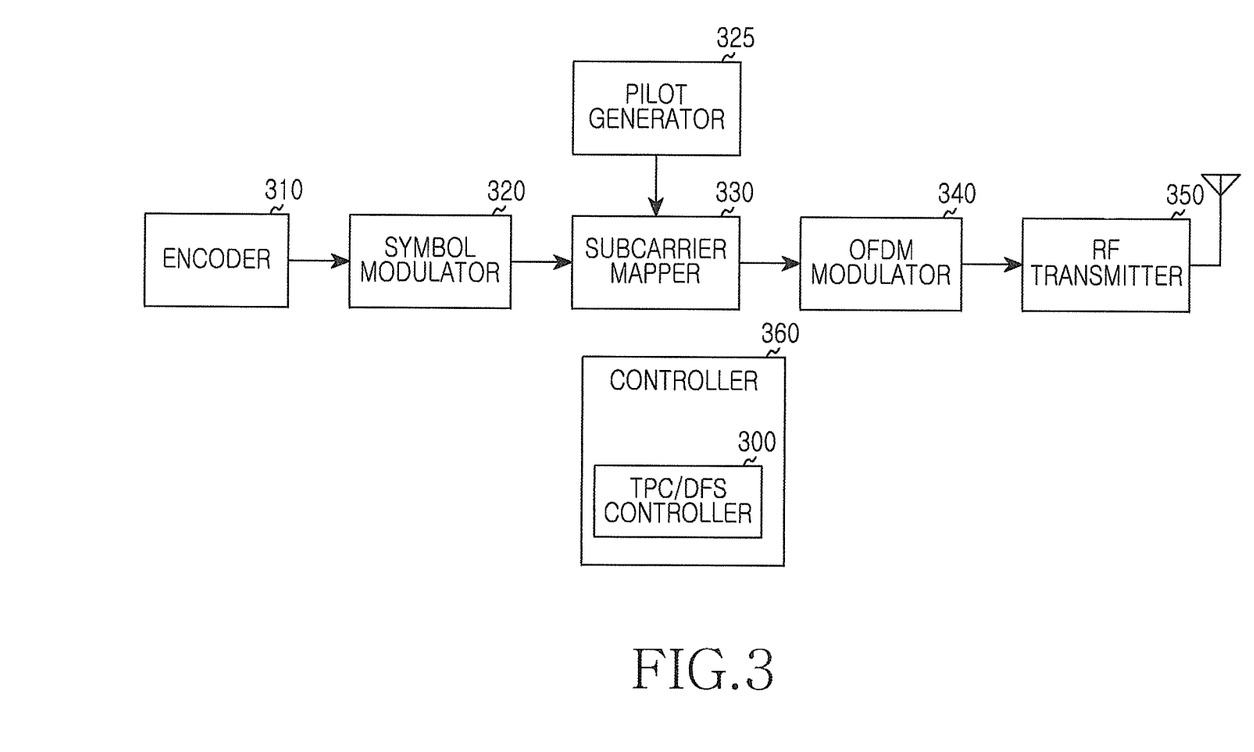
FIG. 3 illustrates a block diagram of a transmitting unit of a mobile BS according to an embodiment of the present invention.

FIG. 3 illustrates a block diagram of a transmitting unit of a mobile BS according to an embodiment of the present invention.

Referring to FIG. 3, the BS includes an encoder 310, a symbol modulator 320, a pilot generator 325, a subcarrier mapper 330, an Orthogonal Frequency Division Multiplexing (OFDM) modulator 340, a Radio Frequency (RF) transmitter 350, and a controller 360. Here, the controller 360 includes a TPC/DFS controller 300. The controller 360 controls the blocks 310 to 350.

The encoder 310 encodes a data bit stream provided from an upper block (not illustrated). The symbol modulator 320 converts the encoded bit stream into complex symbols through modulation.

The pilot generator 325 generates pilot signals and provides the pilot signals to the subcarrier mapper 330. At this time, when the pilot signals are scrambled, the pilot generator 325 multiplexes a pilot signal sequence by a scrambling code and provides pilot signals multiplied by the scrambling code to the subcarrier mapper 330.

The subcarrier mapper 330 maps the complex symbol and pilot signal to a subcarrier, thereby configuring frequency domain signals.

The OFDM modulator 340 converts frequency domain signals into time domain signals through Inverse Fast Fourier Transform (IFFT) operation and then, by inserting a Cyclic Prefix (CP), configures OFDM symbols of a baseband.

The RF transmitter 350 converts the baseband OFDM symbols into a signal of an RF band and transmits the RF band signal through an antenna.

The TPC/DFS controller 300 is the same as a TPC/DFS controller 400 of FIG. 4 described later, and its description is made with reference to FIG. 4.

In the above block construction, the controller 360 may perform the function of the TPC/DFS controller 300. Although the controller 360 and the TPC/DFS controller are illustrated and described as separate elements in order to distinguish and describe respective functions in the present invention, they may be integrated or combined into a single element.

Thus, when a product is actually realized, the product can be constructed such that the controller 360 may process all of the functions of the TPC/DFS controller 300, or can be constructed such that the controller 360 may process only part of the functions of the TPC/DFW controller 300. Also, the remaining function blocks except the controller 360 may be called a 'transmitting unit'.

Figure 4:
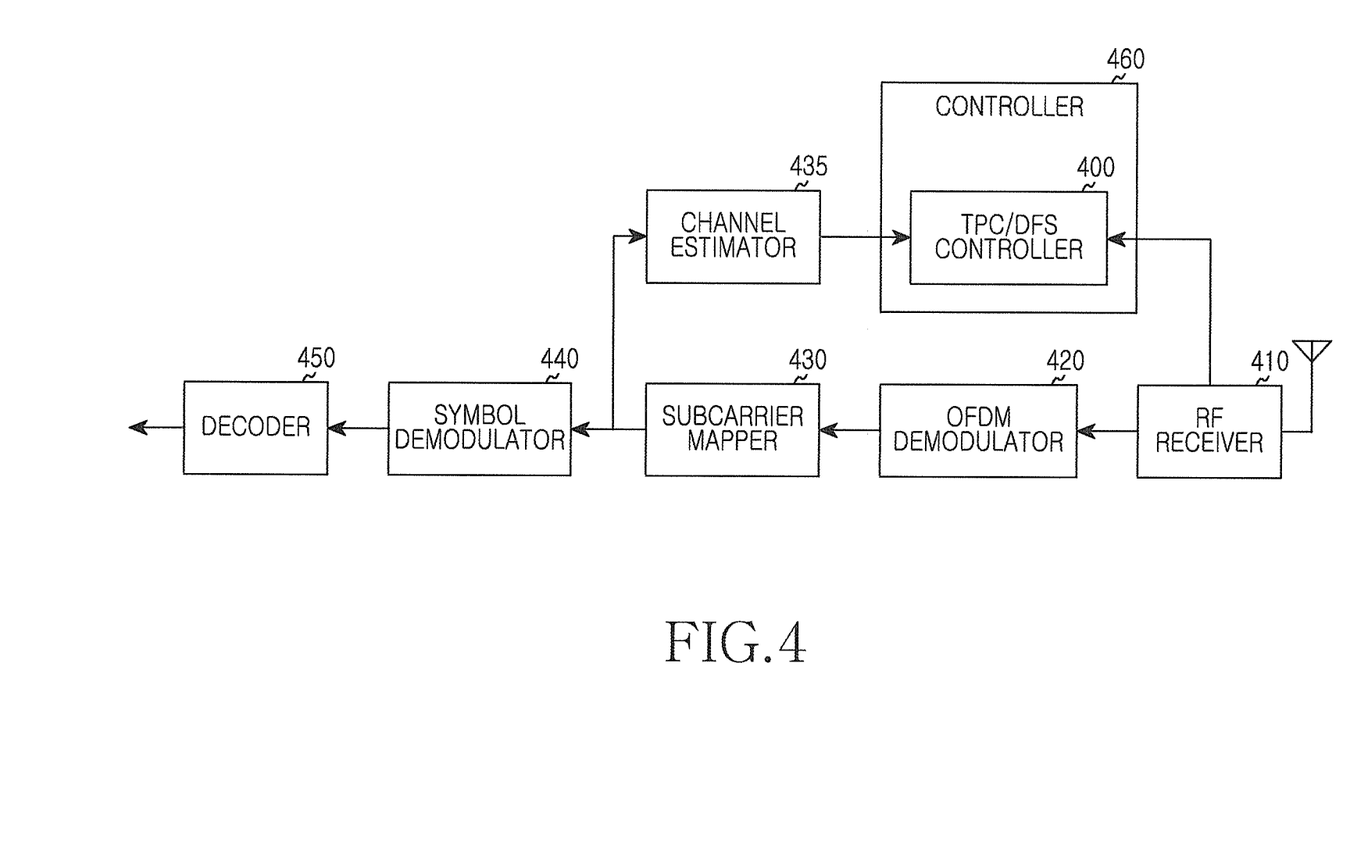
FIG. 4 illustrates a block diagram of a receiving unit of a mobile BS according to an embodiment of the present invention.

FIG. 4 illustrates a block diagram of a receiving unit of a mobile BS according to an embodiment of the present invention.

Referring to FIG. 4, the BS includes an RF receiver 410, an OFDM demodulator 420, a subcarrier demapper 430, a channel estimator 435, a symbol demodulator 440, a decoder 450, and a controller 460. The controller 460 includes a TPC/DFS controller 400, which controls the blocks 410 to 450.

The RF receiver 410 converts an RF band signal received through an antenna into a baseband signal. The OFDM demodulator 420 distinguishes the baseband signal in a unit of an OFDM symbol, removes a CP, and restores complex symbols mapped to a frequency domain through Fast Fourier Transform (FFT) operation.

The channel estimator 435 estimates a channel matrix using a pilot signal provided from the subcarrier demapper 430.

The symbol demodulator 440 converts complex symbols into an encoded bit stream through demodulation. The decoder 450 decodes the encoded bit stream and provides the decoded bit stream to an upper block.

The TPC/DFS controller 400 determines information of a CMBS through channel measurement using the channel estimator 435 and determines information on its own mobility. The TPC/DFS controller 400 also determines whether its own CMBSs get closer or farther based on the determined channel measurement value and, based on this determination, models a network environment dependent on its own movement path.

Based on the modeling result, the TPC/DFS controller 400 predicts an environment most efficient at TPC/DFS. Here, predicting the most efficient environment represents determining what TPC/DFS algorithm it will select.

The TPC/DFS controller 400 makes a preparation to perform TPC/DFS for three situations. The first situation is when the mobile BS prepares to perform TPC/DFS considering only a current state. The second situation is when the mobile BS prepares to perform TPC/DFS based on a situation predicted periodically. The third situation is when the mobile BS does not make any preparation which is assuming a situation of performing no TPC/DFS. Based on these preparations, the TPC/DFS controller 400 performs virtual TPC/DFS and compares respective gains with each other. Based on previous movement, the TPC/DFS controller 400 selects TPC/DFS on a criterion of how effective each TPC/DFS selection has been.

If it is determined on the basis of the selection result that the TPC/DFS controller 400 has no gain or has no particular criterion of mobility during mobility monitoring, i.e., if it is determined that instantaneous TPC/DFS is most effective, the TPC/DFS controller 400 performs TPC/DFS based on the current situation.

If the TPC/DFS controller 400 determines based on the selection result that the mobility has a pattern, the TPC/DFS controller 400 performs TPC/DFS based on a path predicted periodically.

In other situations, the TPC/DFS controller 400 does not perform TPC/DFS.

In the above block construction, the controller 460 may perform the function of the TPC/DFS controller 400. These are shown and described as separate elements in order to distinguish and describe respective functions in the present invention but may be integrated as a single element.

Thus, when a product is actually realized, the product may be constructed such that the controller 460 may process all of the functions of the TPC/DFS controller 400, or may be constructed such that the controller 460 may process only part of the functions. Also, the remaining function blocks except the controller 460 may collectively be called a 'receiving unit'.

Figure 5:
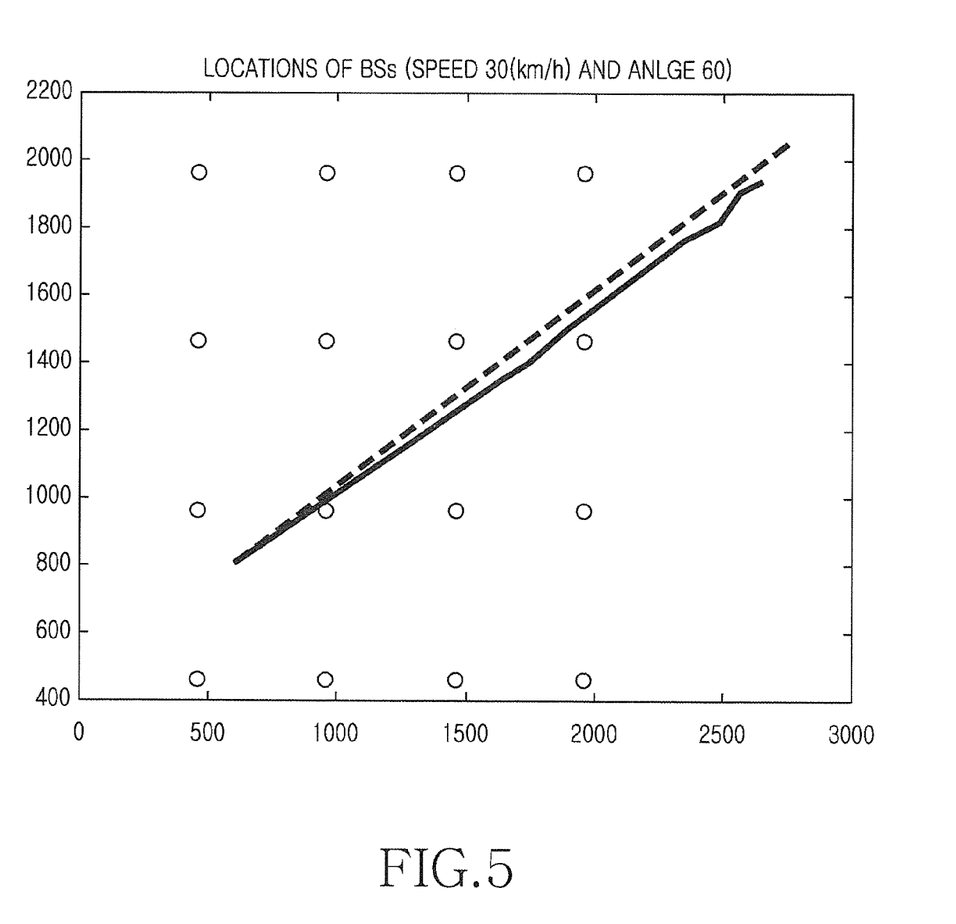
FIG. 5 illustrates a graph of a network environment subjected to simulation according to an embodiment of the present invention.

FIG. 5 illustrates a graph of a network environment subjected to simulation according to an embodiment of the present invention.

In FIG. 5, sixteen fixed BSs exist, and are constructed to give optimum network performance through TPC/DFS. Here, a situation in which one mobile BS moves and passes are considered. A solid line denotes an actual movement path of a mobile BS, and a dotted line denotes an expected movement path of the mobile BS.

At this time, the assumption is that a moving BS performs TPC/DFS at an interval of 5 minutes, and is moving at a speed of 10 kilometers per second (km/s).

Figure 6:
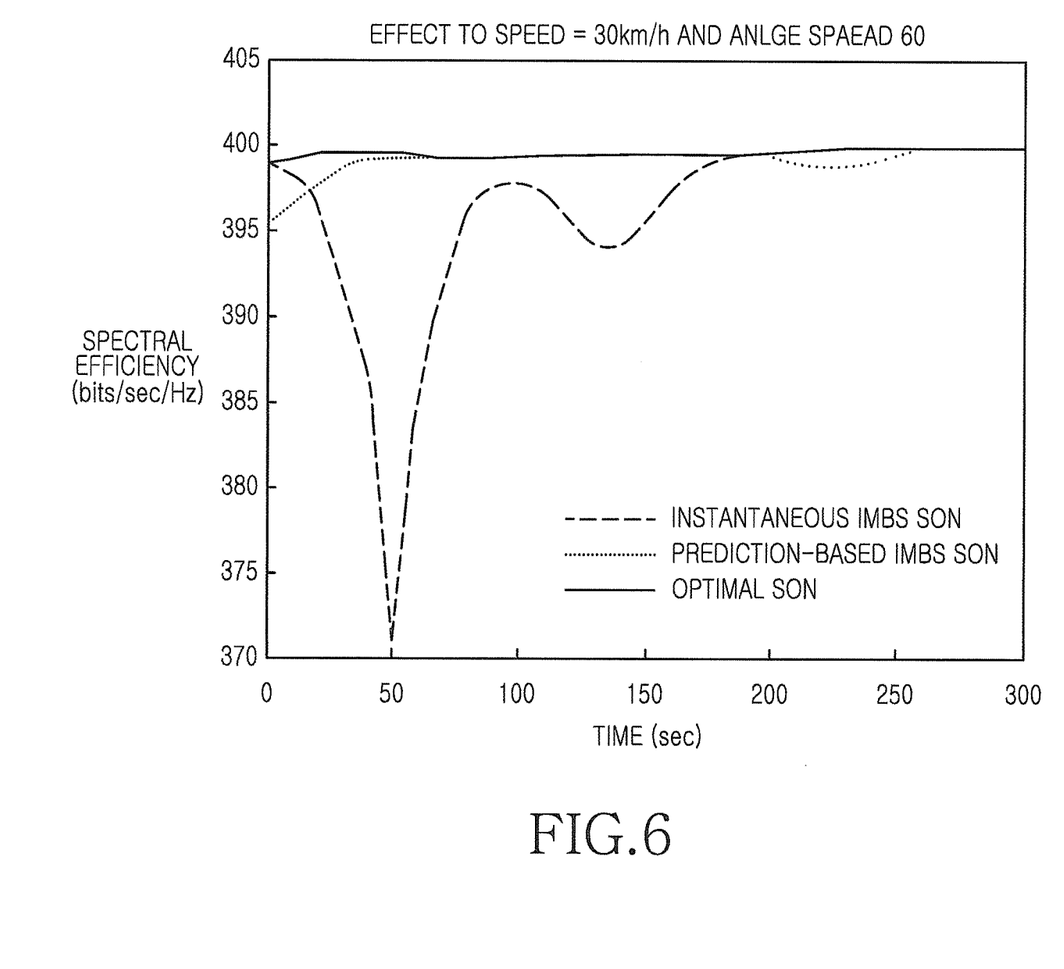
FIG. 6 illustrates a graph of the result of the simulation of FIG. 5 according to an embodiment of the present invention.

FIG. 6 illustrates a graph of the result of the simulation of FIG. 5 according to an embodiment of the present invention.

In FIG. 6, it can be appreciated that the degradation of performance can occur when a mobile BS performs TPC/DFS with only a current situation, i.e., performs instantaneous TPC/DFS. And it can also be appreciated that, when the proposed scheme is applied, it has minimum influence on an existing network, ensuring performance.

As described above, embodiments of the present invention have an advantage of being capable of minimizing influence exerted on an existing network.

Although the present disclosure has been described with an exemplary embodiment, various changes and modifications may be suggested to one skilled in the art. It is intended that the present disclosure encompass such changes and modifications as to fall within the scope of the appended claims.

What is claimed is:

1. A method for Transmit Power Control and Dynamic Frequency Selection (TPC/DFS) in a mobile Base Station (BS), the method comprising:
    determining channel measurement information for an adjacent BS and mobility information of the mobile BS;
    predicting, by a TPC/DFS controller, a movement path of the mobile BS based on the determined channel measurement information and the mobility information, wherein predicting the movement path of the mobile BS comprises:
        determining previous mobility information and current mobility information of the mobile BS; and
        predicting the movement path by predicting a change of a channel based on the previous mobility information and the current mobility information; and
    controlling, by the TPC/DFS controller, a TPC/DFS of the mobile BS based on the predicted movement path.

2. The method of claim 1, wherein predicting the movement path of the mobile BS comprises:
    determining whether the adjacent BS gets closer or farther based on the channel measurement information for the adjacent BS.

3. The method of claim 2, wherein determining whether the adjacent BS gets closer or farther based on the channel measurement information comprises estimating a signal strength of a pilot signal from the adjacent BS.

4. The method of claim 1, wherein controlling the TPC/DFS of the mobile BS based on the predicted movement path comprises performing instantaneous TPC/DFS when the mobility of the mobile BS has no particular criterion.

5. The method of claim 1, wherein controlling the TPC/DFS of the mobile BS based on the predicted movement path comprises performing TPC/DFS based on the predicted movement path when the mobility information has a pattern.

6. The method of claim 1, wherein controlling the TPC/DFS of the mobile BS based on the predicted movement path comprises reducing overhead by not performing TPC/DFS when a movement speed of the mobile BS is greater than a threshold speed.

7. The method of claim 1, wherein determining the predicted movement path of the mobile BS comprises predicting a path loss exponent of the mobile BS.

8. An apparatus of a mobile Base Station (BS) performing Transmit Power Control and Dynamic Frequency Selection (TPC/DFS), the apparatus comprising:
    a receiver configured to measure channel information for an adjacent BS; and
    a TPC/DFS controller configured to determine the channel measurement information for the adjacent BS and mobility information of the mobile BS, predict a movement path of the mobile BS based on the determined channel measurement information and the mobility information, determine previous mobility information and current mobility information on mobility of the mobile BS and determine the predicted movement path of the mobile BS by predicting a change of a channel based on the previous mobility information and the current mobility information, and control a TPC/DFS of the mobile BS based on the predicted movement path.

9. The apparatus of claim 8, wherein the TPC/DFS controller is further configured to determine whether the adjacent BS gets closer or farther based on the channel measurement information for the adjacent BS.

10. The apparatus of claim 8, wherein the TPC/DFS controller is further configured to perform instantaneous TPC/DFS when a mobility information of the mobile BS has no particular pattern.

11. The apparatus of claim 8, wherein the TPC/DFS controller is further configured to perform TPC/DFS based on the predicted movement path when the mobility information has a pattern.

12. The apparatus of claim 8, wherein the TPC/DFS controller is further configured to reduce overhead by not performing TPC/DFS when a movement speed of the mobile BS is greater than a threshold speed.

13. The apparatus of claim 8, wherein the TPC/DFS controller is further configured to determine the predicted movement path of the mobile BS by predicting a path loss exponent of the mobile BS.

14. The apparatus of claim 8, further comprising a channel estimator configured to estimate a signal strength of a pilot signal from the adjacent BS, wherein the TPC/DFS controller is further configured to determine whether the adjacent BS gets closer or farther based on the signal strength of the pilot signal.

15. An apparatus for performing Transmit Power Control and Dynamic Frequency Selection (TPC/DFS) in a mobile Base Station (BS), the apparatus comprising:
    a TPC/DFS controller configured to:
        determine channel measurement information for an adjacent BS and mobility information of the mobile BS, predict a movement path of the mobile BS based on the determined channel measurement information and the mobility information, determine a previous movement and a current movement of the mobile BS, predict the movement path of the mobile BS by predicting a change of a channel based on the previous movement and the current movement, and control a TPC/DFS of the mobile BS based on the predicted movement path.

16. The apparatus of claim 15, wherein the TPC/DFS controller is further configured to determine whether the adjacent BS gets closer or farther.

17. The apparatus of claim 15, wherein the TPC/DFS controller is further configured to perform instantaneous TPC/DFS when the movement of the mobile BS lacks a particular pattern.

18. The apparatus of claim 15, wherein the TPC/DFS controller is further configured to perform TPC/DFS based on the predicted movement path when movement has a pattern.

19. The apparatus of claim 15, wherein the TPC/DFS controller is further configured to determine the predicted movement path of the mobile BS by predicting a path loss exponent of the mobile BS.

20. The apparatus of claim 15, further comprising a channel estimator configured to estimate a signal strength of the received signals, wherein the TPC/DFS controller is further configured to determine whether the adjacent BS gets closer or farther based on the signal strength of the received signals.

\* \* \* \* \*